Oct. 6, 1970   S. I. SIMON   3,532,956
AUTOMATIC STEP RESET CONTROLLER
Filed Feb. 26, 1968
2 Sheets-Sheet 1
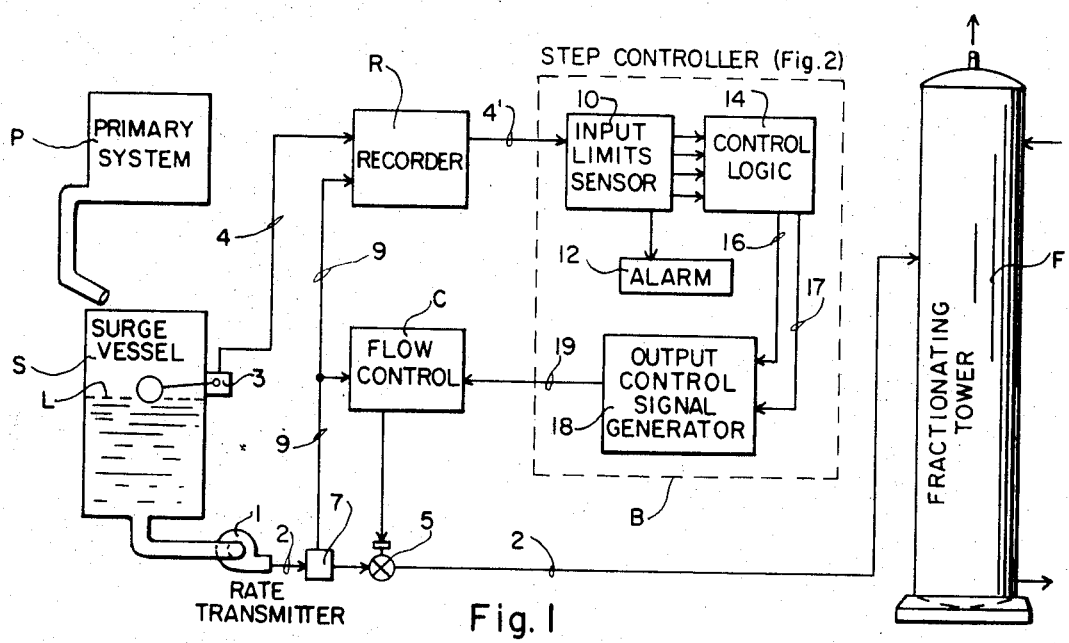
Fig. 1
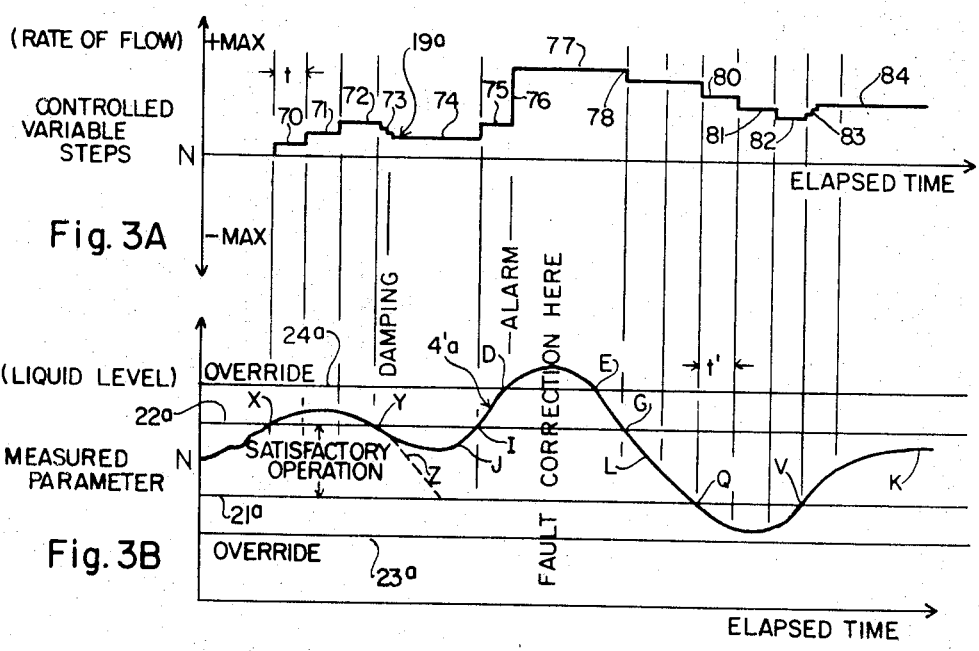
Fig. 3A
Fig. 3B
INVENTOR.
STEVEN I. SIMON
BY
Alexander & Dowell
ATTORNEYS.

INVENTOR.
STEVEN I. SIMON

UNITED STATES PATENT OFFICE 3,532,956
Patented Oct. 6, 1970

3,532,956
AUTOMATIC STEP RESET CONTROLLER
Steven I. Simon, 1204 Stavebank Road,
Port Credit, Ontario, Canada
Filed Feb. 26, 1968, Ser. No. 708,383
Int. Cl. G05b 11/42
U.S. Cl. 318—609  9 Claims

ABSTRACT OF THE DISCLOSURE

An automatic step controller for controlling the overall performance of a system, such as a physical or chemical process, by measuring a system parameter and using the measurement to determine necessary changes in a controlled variable to which the performance of the system is sensitive, generally wherein the steady-state effect of the change made can be determined only after a delay whose time-lag is inherent in the system. The present step controller is especially useful where the relationship between the controlled variable and the measured parameter is a complex function. The step controller establishes operational limits within which fluctuating values of the measured parameter result in no command changes, but beyond which any drift of the measured parameter automatically causes: a predetermined incremental step adjustment of the controlled variable in a corrective direction; followed by a delay interval of predetermined duration approximating said system-stabilizing time lag; followed by another predetermined incremental step adjustment of the controlled variable, but only if the measured parameter is still outside of the established operational limits. As soon as the measured parameter again falls within the established limits a damping means, which has kept track of the extent of the incremental step adjustments required to restabilize operation of the system within said limits, reverses the direction of said step adjustments and causes said controlled variable to be counteradjusted to a predetermined percentage of the said recently made step adjustments to prevent the system performance from overshooting in the opposite direction. The controller further includes override emergency control and alarm means with limits beyond which control adjustments cannot be made to go under any circumstances.

---

This invention relates to improvements in automatic step controllers for efficiently maintaining continuous processes within satisfactory operating limits about a set point, and for taking drastic corrective measures in the event that a strong trend away from those operating limits occurs, which normal corrective steps are inadequate to check.

U.S. Pat. 3,067,766 to Connell provides a good discussion of the background which makes desirable the type of automatic step control to which this invention relates, wherein the controller seeks to maintain as constant as possible one variable of the process being controlled while permitting limited wandering of a related meaured parameter within preestablished limits, the automatic controller from time to time making step-type changes in the controlled variable to check excursions of the measured parameter outside of the set limits. For instance, where a liquid is being continuously flowed from a surge vessel to a fractionating tower, it is very important to maintain as constant as possible the flow rate to the tower (controlled variable), since the latter's efficiency is adversely affected by variations in its input flow rate. On the other, hand, the level of the liquid in the surge vessel (measured parameter) is not important so long as it remains within predetermined operating limits. However, if the level goes beyond those limits, then it becomes necessary to alter the effluent flow rate from the vessel to the tower in order to save the equipment from damage, or to save the batch. If a step-change is made in the flow rate, it will be some time before a new level will stabilize in the surge vessel, and therefore it is necessary to wait for a lag-interval before observing the true effect of the step-change, and before deciding whether to make another step change in flow rate in an effort to further alter the liquid level in the surge vessel. On the other hand, after corrective step changes have been made in the flow rate adequate to cause the liquid level to progress in the desired direction, if these step changes remain continuously in effect, the level will continue to change in that same direction until eventually it overshoots the operating limit toward which it is being altered, thereby requiring reverse-direction corrective steps which also will eventually cause overshooting. A major problem with prior art step controllers is that they tend never to stabilize within the operating limits, but instead hunt back and forth about a desired operating point.

It is a principal object of this invention to provide an improved automatic step controller having adjustable control-damping means for counteracting part of the step-change control effect once the system has returned within the normal operating range set by said limits, this counteraction being made sufficient to reduce the rate of change of the measured parameter (vessel level) substantially to zero by counteradjusting the controlled variable (flow rate) once a satisfactory operating level has been attained, thereby greatly reducing the frequency at which adjustments in the flow rate to the fractionating tower need to be made.

Another major object of this invention is to provide automatic means for sensing an emergency condition which may be beyond the capability of the incremental step-changes to cure. Such an emergency might occur when a pipe bursts or when a stoppage occurs somewhere in the process system. The improved controller, when faced with such an emergency, disables the incremental step-control circuitry, sounds an alarm summoning outside help, and advances the controlled variable all the way in the corrective direction to reduce the hazard as much as possible until the personnel summoned can clear the fault. Once the fault is cleared, the automatic controller will return the flow rate to a stabilized value automatically, or alternatively, the controller has provision for manual operation of the system which can be used to return it to an approximately stable condition somewhat more quickly.

Another important object of the invention is to provide a highly versatile step controller which can be used to control a large variety of physical and chemical processes. For example in the recovery of copper from ore, the slurried ore is introduced into a long tumbling drum through which it progresses in a certain number of minutes. Certain chemical reagents are added to the ore to treat it as it passes through the drum, and the oxygen potential of the resulting mixture is monitored by a Redox instrument whose output provides said measured parameter showing whether the proper amount of chemical reagent was mixed with the entering ore. The quantity of ore introduced into the drum and its own momentary chemical makeup both continuously fluctuate and cause undesired excursions in the measured parameter. The present step controller changes in step-fashion the controlled input variable, i.e., the amount of said chemical reagent added, in an effort to make its addition optimum, but the true effect of each step change can only be determined after the elapse of the transit time of the ore through the drum, the relationship of the measured Redox parameter to the input variables such as ore quantity, ore content, and chemical reagent added being quite nonlinear. Other diverse uses of the present step controller include modulating the height of a flame, or an electric heater resistance, in response to the temperature of a slow-heating mass; the adjustment of a roller position in response to a remotely-located tension measurement; the adjustment of dryer controls in response to measured humidity; the adjustment of the quantity of pebbles in a pebble mill to maintain efficient pulverization of a varying granular material without wasting power to drive the mill; and other applications in various nuclear, petrochemical, metallurgical, physical, electrical or chemical systems.

A further important object of the invention is to provide a versatile step controller having adjustable features including: upper and lower set-point limits defining a satisfactory operating range, upper and lower emergency override positions, upper and lower limitations beyond which the controlled variable cannot be driven regardless of emergency circumstances; length of time between successive steps (representing process-lag); the size of each step; and size of each reverse-direction damping step in terms of percent of each forward step adjustment.

Still another object of the invention is to provide a novel means for stepping the controlled variable in the prescribed direction through increments which are actually repeatable, free of backlash, and can be graduated to follow a prescribed function having any selected curve; i.e., linear, exponential or square root, or can be arbitrarily graduated to fit the relationships existing in a given control application. The present system employs a motor-driven cam, whose follower introduces no step adjustment when the cam is rotationally centered, but which introduces step adjustments of the controlled variable whose magnitudes depend upon the offcenter displacement of the cam, and whose step-direction depends upon the direction of such displacement. The contour of the cam determines the relative proportioning of the steps resulting from its displacement, but the absolute sizes of these steps are further adjustable to suit system characteristic needs. For instance, in the working embodiment of the surge vessel-level versus flow-rate example described below and illustrated in the drawings, a 2% step change in the flow rate was found most satisfactory to achieve stable control, whereas about 1/3 that amount was found best for the counteradjustment made for damping purposes to prevent overshoot of the controlled variable after reentry thereof within the operating range set-limits.

A further object of the invention is to provide a constant speed cam drive in which preset timers control the number of seconds the cam is driven to complete an overall displacement representing each step change, two separate timer adjustments determining the forward incrementing steps and the retracting cam-motions in which the latter are proportioned to a selected percentage of the former.

Still another object of the invention is to provide an improved input signal limit-sensor within a step controller, this sensor comprising a relay meter for measuring the system parameter and continuously displaying its value on the same instrument-face as also includes the operating preset levels as well as the emergency override levels, whereby an operator of the controller can see at a glance the existing condition of the measured parameter. It is a corrolary object of the invention to display the output signal of the controlled system on an instrument adjacent thereto so that its momentary values can be viewed to permit the operator of the system to conveniently compare this reading with the level of control being applied to the measured parameters.

Other objects and advantages of the invention will become apparent during the following discussion of the drawings, wherein:

FIG. 1 is a block diagram of a step controller according to the present invention combined with a feed system for feeding a fractionating tower from a surge vessel, the controller controlling the rate of flow from the vessel in order to maintain the latter's liquid level;

FIG. 3 includes two collimated graphical presentations 3A and 3B used in describing the operation of the system shown in FIG. 1.

Figure 2:
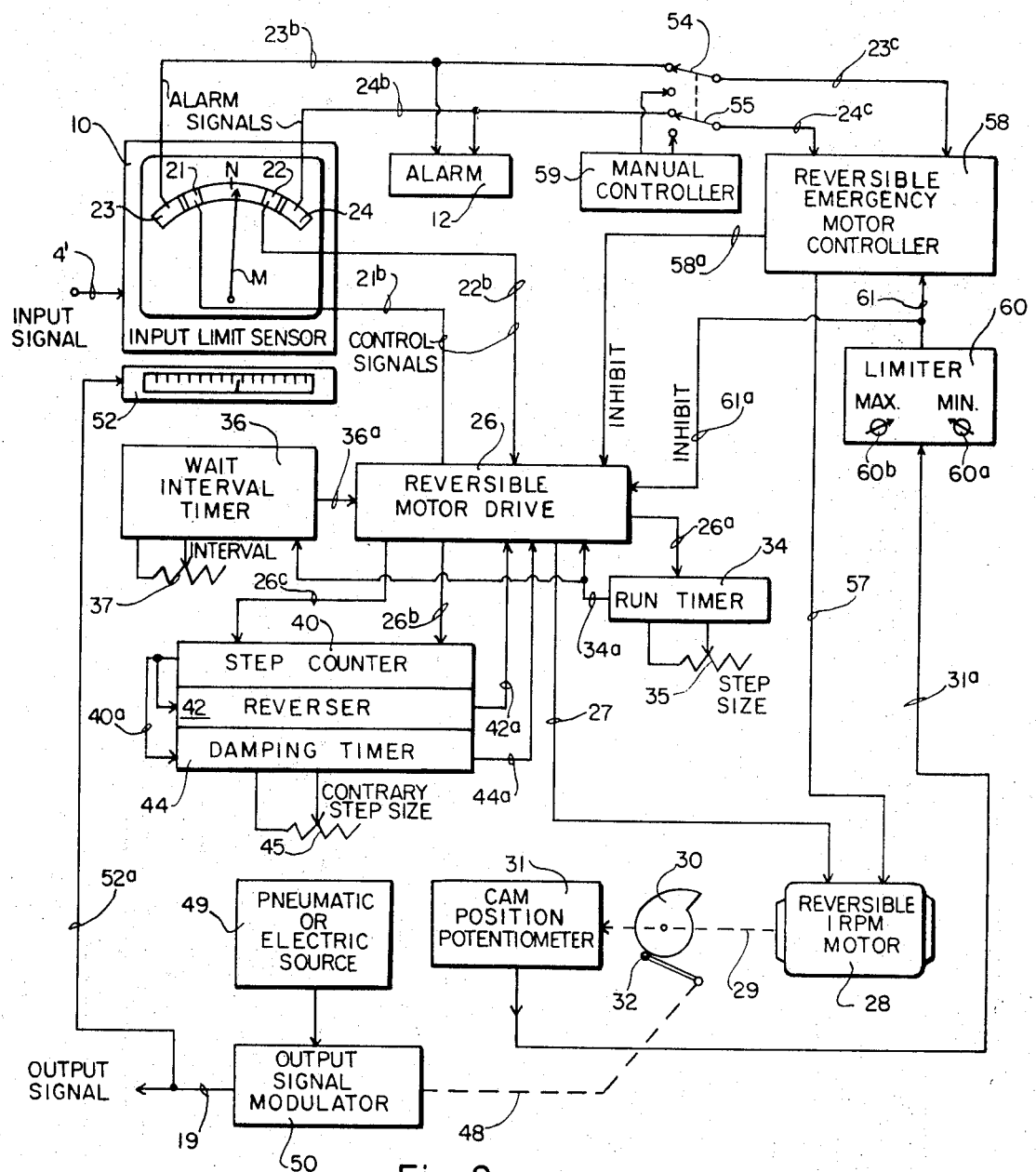
FIG. 2 is a more detailed block diagram showing the subunits which comprise the present step controller.

Referring now to FIG. 1, this figure provides an illustrative example in which a liquid, such as a petroleum product is fed from a primary system P into a surge vessel S from which the petroleum is pumped by a pump 1 through a pipeline 2 into a fractionating tower F where it is separated into components according to volatility. It is well-known in the fractionating art that it is important to maintain the flow through the pipe 2 into the fractionating tower F as constant as possible. On the other hand, the primary system P from which the petroleum product is taken has its own fluctuation problems, and the purpose of the surge vessel S is to provide a certain storage capacity to isolate fluctuations in the primary system P from the fractionating tower F. The liquid has a certain level L in the surge vessel, and this level can fluctuate through wide limits without damage to the vessel, and without danger of its going dry. The actual level L of the liquid is measured by an ordinary transmitter 3 and is customarily delivered on lead 4 to a conventional recorder R found in most systems of this type. The rate of flow of the liquid from the pump 1 through the pipe 2 is maintained by a flow controller C in the customary manner, the flow controller controlling a flow valve 5 in the pipeline 2, and in turn receiving feedback on lead 9 indicating the rate of flow as determined by the transmitter 7 which is also in the pipeline 2. The controller C, valve 5, and transmitter 7 are well-known in the prior art and are purchased on the open market from one of several sources. The flow controller can be either electrical or pneumatic, since both types are manufactured and interchangeably used. In systems having no step controller of the type about to be discussed, the flow controller is manually adjusted to maintain a constant flow rate by modulating the valve 5 in accordance with feedback signals taken from the transmitter 7 through the connection 9. Operating personnel would readjust the flow controller C whenever necessary to prevent the surge vessel S from overflowing, or from going dry. The system shown in the Connell Pat. 3,067,766 employs a step controller for automatically making adjustments similar to those which would be made by operating personnel in the absence of a step controller, and the present invention provides an improved step controller of generally similar type, shown within the dashed block B in FIG. 1, whose circuitry is expanded in greater detail in FIG. 2.

Referring to the block B in FIG. 1, the step controller comprises an input signal module 10 which receives the input signal taken from the level transmitter 3 via lead 4, the recorder R, and the wire 4' to the limits sensor 10. The input module 10 has four different possible outgoing signals as follows: two of these signals relate to upper and lower limits of a normal operating range within which no step-control need be initiated. The other two possible outgoing signals relate to upper and lower emergency overrides, one of which will be energized whenever the system performance as shown by the input signal 4' has passed beyond the ability of the incremental step control function to correct and in this event an alarm 12 will be sounded to alert operating personnel that outside assistance is required.

The step controller in the block B also includes control logic 14 which is described in greater detail in FIG. 2 and which delivers up or down control signals on the respective wires 16 and 17 designed to actuate an output control signal generator 18 to deliver stepped output voltages on line 19 to control the flow controller C.

Referring to the graphs shown in FIGS. 3A and 3B, the trace shown in 3A and labeled 19a refers to the output signal on line 19, and the trace 4'a in FIG. 3B refers to the input signal 4' representing liquid level in the surge vessel S. In FIG. 1, it may also be desirable to connect the output of the rate transmitter 7 on line 9 with the recorder R so that the recorder will simultaneously record both the liquid level L indicated to it by input line 4 and the continuous flow rate of liquid through the pipe 2 as indicated to it through the line 9.

Referring now to FIG. 2 the input to the step controller sensor on line 4' is an analog electrical or pneumatic signal indicating the level L of the liquid in the surge vessel S. Assuming for present illustration that the input signal on line 4' is an electrical potential, the input limit sensor used in the working embodiments of the present invention comprises a meter relay including a precision meter movement and a pointer which cooperates with four movable set points on the meter face to provide certain control signals which occur after meter displacement through a preset angle. In the present case, these four adjustable presets on the meter face are illustrated in the FIG. 2 embodiment as contacts 21, 22, 23, and 24 selectively placed around a center point N of the meter scale comprising a normal center value for the level of the liquid in the surge vessel S. Although the set points 21, 22, 23, and 24 are illustrated in the present diagram as ohmic electrical contacts, in the working embodiment of the invention, these are photoelectric readout devices which provide more trouble-free operation and better repeatability. In general, this type of input limit sensor has no backlash, enjoys a high degree of accuracy, and provides readings which are visually readable, all of which is important to proper and convenient operation of the over-all system.

Referring to FIG. 2 and FIG. 3B, the system is permitted to operate without any correction whatever so long as the measured parameter, namely the liquid level as read by the meter pointer M falls between two set operating limits graphically illustrated in FIG. 3B as the horizontal lines 22a and 21a, and represented by the set points 21 and 22 on the face of the input limit sensor 10. As long as the pointer M stays between the set-points 21 and 22, the step controller remains dormant as will be described hereinafter in connection with operation of the system. The positions 23 and 24 represent override set points which when reached by the meter pointer M initiate an emergency mode of operation. A variation of the liquid level L which initiates such an alarm condition is represented by the override levels labeled 23a and 24a in FIG. 3B.

STEP CONTROL

Referring again to FIGS. 2 and 3, during normal (non-emergency) operation of the system, the meter pointer M fluctuates about the normal center point N and eventually drifts against one of the set points 21 or 22, for instance as shown at the point X on the curve 4'a in FIG. 3B, indicating that the liquid level has reached such a height in the surge vessel as to require the system to initiate steps to increase the flow of liquid through the pipe 2 in order to begin lowering the level in the surge vessel S. This means that the set-point 22 in FIG. 2 has been reached by the meter pointer M, thus sending a signal on wire 22b to the reversible motor drive circuit 26. The fact that an output appears on wire 22b instead of on wire 21b determines that the motor drive shall be driven in a direction which will increase the flow through the pipe 2 instead of decreasing it. Had the output from the limit sensor 10 appeared on the wire 21b, the motor drive would have occured in the reverse direction, namely to reduce the flow rate in the pipe 2 (the actual rate control means being described hereinafter).

When the motor drive circuit 26 is actuated, it delivers the correct signal on lead 27 to drive a 1 r.p.m. motor 28 in the selected direction, the shaft 29 of this motor supporting a cam 30 and driving a potentiometer 31 for indicating the actual position of the cam 30 with respect to the cam follower 32, for the purpose hereinafter described. The angular displacement of the cam 30 determines the amount of change which will be made in the flow rate through the pipe 2, and the direction of displacement of the cam 30 determines the direction in which the flow rate in the pipe 2 will be changed.

In view of the fact that the 1 r.p.m. motor 28 always runs at a constant speed when energized, the size of each step-change in the flow rate is determined only by the length of time that the 1 r.p.m. motor is energized and this length of time is controlled by the run-timer circuit 34. When the motor drive 26 is actuated it delivers a signal on wire 26a to commence the run timer 34 operating. At the end of the run-time, the timer 34 delivers a signal on wire 34a which shuts off the motor drive. This signal on wire 34a is also delivered to a wait-interval timer 36 to commence its operation, and the timer 36 then disables the motor drive circuit 26 through the inhibit wire 36a for a certain length of time during which no further change can be made in the flow rate through the pipe 2 in spite of the fact that the pointer M of the limit sensor may still be actuating the set-point contact 22. The length of time for which the wait-interval timer is set should be approximately equal to the over-all lag of the process being controlled, and only after such a wait is it possible to determine the precise effect which a change will have upon the system. The duration of the wait-interval between steps is controlled by adjustment of a potentiometer 37, and the size of each step made under the control of the run-timer 34 is adjusted by changes in the setting of the potentiometer 35, this adjustment controlling the magnitude of the angular displacement of the cam 30 for each step change initiated.

After the wait-interval concludes and the timer 36 stops sending an inhibit signal on the wire 36a, the motor drive circuit 26 can again become operative if the meter pointer M is still opposite the set point contact 22, indicating that at the end of the first wait interval, not enough increase in flow rate had been accomplished to return the pointer M within the satisfactory operating range between the set points 21 and 22. Therefore, a signal still appears on wire 22b, and the motor drive initiates a second step by energizing the lead 27 to the 1 r.p.m. motor and sending a new signal on wire 26a to commence the run timer 34 operating. The timer 34 runs for the interval for which it is adjusted and then delivers a new signal on wire 34a inhibiting the motor 26 and starting the wait interval timer 36 operating again. Thus, as long as a signal appears on wire 22b, equal angular steps in the position of the cam 30 will be initiated, the size of each step being determined by the run timer and the interval between each of the steps being determined by the wait interval timer.

Eventually, in a normally-operating system, the flow through the pipeline 2 will have been increased by the cumulative effect of these steps to such an extent that the level L in the surge vessel will be restored within the satisfactory operating range, and the signal will disappear from the wire 22b, thereby disabling the motor drive circuit 26 and leaving the cam 30 in the position which it then occupies.

Each time the motor drive circuit was energized to initiate another step, it delivered an output on the wire 26b to advance a step counter 40 which accumulates the number of steps made during that flow adjustment sequence by counting the number of step indications transmitted to it on the wire 26b. Eventually, when the meter pointer M moves away from the set point 22, an output indicating this fact is delivered on wire 26c to the step counter 40 indicating that the meter pointer M is again within the satisfactory operating range, and that the system has been restored to normal operation.

The reentry into the satisfactory operating range occurs at point Y in FIG. 3B, and the system is now operating normally. However, the flow rate has actually been overly increased so that the performance of the system would continue to change along the dashed curve Z in FIG. 3B, with the result that, if not checked, the level of the liquid in the surge vessel would approach the too-low preset 21a and would initiate correction of the circuit in the other direction by a series of steps which would eventually cause overshooting once more in the upper direction. Thus, the system would continuously hunt back and forth and would require frequent corrections in the flow rate to the fractionating tower F in the pipeline 2, which is exactly what the present system seeks to avoid.

Therefore, an automatic process-control damping means is provided to prevent this occurrence by counter-controlling the flow rate once the system is back within normal operating limits to stop the downward slope of the dashed curve Z and make it level out within the satisfactory operating limits 21a and 22a. This function is accomplished by reversing the motor drive circuit 26 from the direction in which it last stepped and causing it to return through a series of smaller steps so as to partially counteract the original control function.

As pointed out above the step controller 40 counts the number of steps transmitted to it on wire 26b and stops counting whenever the meter pointer M moves away from the set point 22 as indicated by a signal on wire 26c. When the signal appears on wire 26c the step counter 40 initiates a signal on wire 40a to the reverser 42 and damping timer 44. The reverser which puts out a signal on wire 42a reversing the motor drive circuit 26 and energizing it to drive the 1 r.p.m. motor 28 in the contrary direction through the same number of steps as the counter 40 originally counted, but each one of these steps has a shorter duration which is controlled by a damping timer 44 whose timing interval is adjusted by a rheostat 45. The timer 44 is set in motion each time the step counter while counting itself back downwardly again initiates a signal for a new contrary count. The damping timer 44 controls the duration of operation of the motor drive 26 by an enabling signal on the wire 44a, and the run timer 34 is not operative. Since the number of contrary steps to be made equals the number of adjustment steps previously made in the opposite direction, the damping timer 44 will be set for less duration than the run timer 34, with the result that the steps in the contrary direction are scaled down and have a smaller net effect than the initial incremental steps. The percentage by which they are scaled down will be determined on an empirical basis to suit system operation, and the adjustment of the potentiometer 45 therefore becomes an adjustment of the amount of damping as will be indicated hereinafter in connection with a fuller discussion of FIGS. 3A and 3 B.

Referring now to the output control signal generating means which includes, in part, the motor 28 and the cam 30 with its follower 32, the follower 32 can be connected to any type of analog signal modulating device 50. Incidentally, a digital system can be used as well, although the present system will be described in analog terms. In the working embodiment which the present drawings illustrate the output signal appearing on line 19 is pneumatic and is generated by a pneumatic pilot valve in the modulator 50 which has a plunger spindle represented by the mechanical line 48 whose reciprocating position within the body of the pilot valve is determined by the displacement of the came follower 32. A source of pneumatic pressure 49 feeds the housing of the pilot valve 50 and is modulated by the position of the plunger spindle 48 to provide a pneumatic output signal on line 19 which is connected directly with the pneumatic flow rate controller C shown in FIG. 1. If the controller C were of the type which required an electrical signal on the line 19, then the source 49 would be an electrical source, and the output signal modulator could comprise a potentiometer whose shaft was positioned by the cam follower 32. In either event, the cam 30 is a most desirable intermediary between the motor 28 and the control signal line 19 because the cam can be cut to provide any desired linear, exponential, or other mathematical function expressing the desired relationship between angular displacement of the motor shaft 29 and the magnitude of the control signal on the line 19. An output signal indication in the form of a gauge or meter 52 is desirably connected by a line 52a to the output signal line 19. In the working embodiment of the present invention, the indicator 52 and the input limit sensor 10 are clustered together so that an operator can conveniently read at a glance the overall operating condition of the system.

EMERGENCY OPERATION

The other two set points 23 and 24 on the input limit sensor are used to sense emergency conditions in which the meter pointer M has gone beyond a reasonable range of readings which requires step correction and has arrived at a hazardous condition, as indicated when the pointer M reaches either set point 23 or 24. Assume for the sake of discussion that a stoppage has occurred somewhere in the output of the surge vessel S and that the liquid level L is rapidly building up in that vessel so that the meter pointer M reaches set point 24 and energizes the wire 24b. The energizing of this wire immediately sets off the alarm 12, and assuming that the switches 54–55 are in the position shown in FIG. 2, a signal is delivered on wire 24c to the reversible emergency motor controller 58 indicating to it the direction in which it should drive the 1 r.p.m. motor 28 via wire 57 in an effort to counteract the fault causing the surge tank level to rise to a dangerous point. In this case, the motor 28 and cam 30 should be driven in such a direction as to increase the flow through the pipeline 2 to a maximum in an effort to lower the level L in the surge vessel S. The emergency motor controller 58 therefore sends out a signal on wire 57 driving the motor 28 in a direction to cause the flow controller C to increase the flow, and this drive to the motor 28 is continuous on the wire 57 (not stepped). The emergency motor controller 58 also delivers an inhibit signal on wire 58a to disable the motor drive 26 while the emergency conditions exist. In other words, the motor drive 26 has already been through a number of steps which occurred while the meter pointer M was contacting the set point 22, but these steps were unable to check the rise of liquid in the surge vessel S. Now the emergency motor controller 58 has inhibited the motor drive 26 from making any further stepped effort, although the number of steps which it has already been through have been counted and stored in the counter 40, and they simply remain there as long as the inhibit wire 58a is energized.

With the alarm 12 sounding, and the wire 57 energized to drive the motor 28 in a direction to increase the flow in pipeline 2, the cam 30 rotates and drives the potentiometer 31 continuously in a direction indicating increasing displacement of the cam. However, there has to be some limit on the drive to the motor 28, and depending upon the type of process being controlled, this limit may well be a practical limit designed to prevent a disaster to the process or apparatus. In any event, the output of the potentiometer 31 is sent to a limiter circuit 60 having two adjustable limit controls including a lower limit control 60a and an upper limit control 60b. As long as the potential on wire 31a from the cam-position potentiometer 31 is within the limits set by the controls 60a and 60b, no signal appears on wire 61, but when the potential on wire 31a arrives at one of the limits set by the controls 60a and 60b, an output appears on wire 61, and disables the emergency motor controller to the extent of stopping further output in that direction on wire 57, and thereby stopping the 1 r.p.m. motor. The limits set by the limiter 60 are always operative under all conditions and have been preset absolutely to limit extreme displacement of the cam 30 in either direction.

At this point, the alarm is still sounding, the cam 30 has been moved to the maximum extent consistent with safety to increase the flow in the pipeline 2, and the present system has done all that it can do to correct the fault. Presumably an attendant will find the fault and eliminate it, and thereby permit the system to return to normal in a manner to be hereinafter described. Assuming that the personnel have obviated the faulty condition, they can then actuate the switches 54–55 to throw in a manual controller 59 by which the operator can cause a signal to appear on wire 23c and continuously maintain this signal to cause the motor controller 58 to provide a contrary output on wire 57, thereby driving the motor 28 and the cam 30 in the opposite direction to restore the flow rate toward normal as viewed on the indicator 52. In this way, the operator can quickly reset the system to a substantially normal condition before returning the switches 54–55 to the position shown in FIG. 2 to resume automatic step control.

Alternatively, if the operating personnel clears the fault causing the liquid level to rise, but merely walks away from the step controller and leaves it in the final emergency condition set forth above in which the alarm is sounding, the emergency motor controller 58 has driven the motor 28 and cam 30 to the maximum flow rate permitted by the limiter 60, and the limiter has issued a signal on wire 61 disabling the controller's output on wire 57 from driving the motor 28 any further, the system can still recover and stabilize itself automatically, as follows.

Assuming that the blockage has been removed and that the flow rate, being maximum, is lowering the level L of the liquid in the surge vessel S, nothing will happen in the system until the meter pointer M leaves the set point 24 and reestablishes actuation of the set point 22. At this time, the alarm 12 will cease, and the emergency motor controller 58 will no longer receive a signal on wire 24c. Although the motor drive 26 is no longer inhibited by the signal on wire 58a, it is still inhibited by a signal on wire 61a because the cam 30 is still all the way over against the maximum permissible limit, and therefore the reversible motor drive 26 will not attempt to drive the cam any further in the direction to increase flow. Eventually, the meter pointer M will have also moved away from the set point 22, and when this happens an output will occur on the wire 26c to commence the step counter 40 counting in the reverse direction, and to actuate the reverser 42 to provide an output on wire 42a to reverse the motor drive circuit 26, so that when actuated by an output on wire 44a in response to a signal on wire 40a it will drive the 1 r.p.m. motor and cam 30 in a direction to reduce the flow in the pipeline 12 and begin checking the fall of the liquid level in the surge vessel S. If there have been, for instance, 10 steps stored in the counter 40, the counter will initiate 10 reverse steps in succession, the duration of each step being determined by the damping timer 44 which, when actuated by an output on wire 40a, will provide its own output on wire 44a to cause the motor drive 26 to drive the motor 28 in the flow-reducing direction for the duration of time established by the damping timer 44. These damping steps in the contrary direction can be taken either in rapid succession as shown at 73 and 83 in FIG. 3A, or else they can be separated by another wait interval, for instance from the timer 36. The latter alternative can be desirable to reduce shock to a secondary system F which in most cases may be shock-sensitive.

After 10 such contrary steps, the flow rate will have been greatly cut down in the pipeline 2, although perhaps not enough to prevent overshoot in the downward direction which will then have to be checked further by a series of incremental steps in a direction to further decrease flow in the pipeline 2, these steps being initiated when the meter pointer M reaches the set point 21, and initiates a step of magnitude determined by the duration of the run-timer 34 driving the motor 28 and cam 30 in a direction to further reduce flow in the pipeline.

This occurs at the point Q on the curve 4'a, FIG. 3B, and further similar steps continue until the point V when the meter pointer M breaks away from the set point 21 in the sensor 10. When this occurs, the step counter 40 then initiates a series of contrary steps 83, FIG. 3A, required to cause the portion of the curve at K in FIG. 3B to level out between the satisfactory operating limits 21a and 22a. Thus, in automatically returning from the emergency condition, the circuit would probably go through at least one overshoot into the opposite control zone of the diagram shown in FIG. 3B.

Referring further to FIGS. 3A and 3B, the operation of the system as set forth in the above examples can be briefly summarized as follows. Beginning at point N in FIG. 3B, the liquid level as shown by the curve 4'a fluctuates within the satisfactory operating zone until it arrives at the point X where the level is too high. The step controller then initiates a first incremental step from the normal control level point N shown in FIG. 3A in a positive direction to the first step level 70, the run timer 34 having determined the height of the step by the length of time it allowed the 1 r.p.m. motor 28 to run. The interval timer then takes over and presents further stepping for the time "t" shown in FIG. 3A. At the end of this time, the level curve 4'a is still above the satisfactory zone line 22a, and therefore the run timer initiates another upward step in the flow in pipeline 2 to the level 71. By this time, the liquid level has stopped rising according to the curve 4'a, but is still above the satisfactory zone, and therefore a third step up in the pipeline flow is made to the level 72, and after this step the curve 4'a starts downwardly and crosses into the satisfactory zone at the point Y. According to prior art systems, however, the curve 4'a would follow the dashed line Z and get into trouble by crossing the lower limit 21a of the satisfactory operation zone, but the present invention prevents this occurrence by having the step counter 40 count three contrary steps as shown at 73, therefore causing the line 4'a to curve back to level. Thus, the plateau 74 would be the proper control level, and would tend to maintain satisfactory operation.

However, it is further assumed in this example that trouble develops at the point J, such as a partial stoppage in the pipeline 2, thereby causing an emergency condition to commence. The emergency condition follows a course somewhat as described hereinafter, although somewhat simplified. Beginning at point I the curve 4'a indicating liquid level again passes above the satisfactory operating zone and initiates a step to the level 75, which would in all probability comprise a series of steps, rather than just one. At the point D the override set-limit 24 is reached, sounding the alarm and causing a continuous rise along the line 76 in FIG. 3A to the maximum permissible flow rate at plateau 77 as determined by the limiter 60 which stops further rotation of the motor 28.

Assuming at this point that technicians have cleared the stoppage, but did nothing to the step controller, the flow drastically increases in the pipline 2 because the stoppage is cleared, and the liquid level starts back down again. It crosses the override level at point E, but nothing happens until it crosses into the satisfactory zone at point G, and at this time the step controller 40 again actuates the damping timer 44 to step downwardly a certain number of steps, which for the sake of simplicity are merely represented at 78 as a single step. These steps establish a slowing in the rate at which the liquid level is falling between point G and point Q in FIG. 3B, but an overshoot occurs at point Q, thereby causing the meter pointer M to reach the lower set-point 21 causing a downward step to the level 80 in FIG. 3A. This step further slows the fall of liquid level, but at the end of the interval time $t'$ as determined by the wait-timer 36, the flow is still too great in the pipeline 2. Therefore another downward step is made to the level 81, and after another wait interval still another step is made to the level 82, thereby making three steps total. The downward fall of the liquid level L is now checked and rising, and therefore engagement is broken at point V with the set-point 21, thereby causing three damping steps 83 in a contrary direction to raise the flow control signal to the level 84 as indicated in FIG. 3A, these upward steps being initiated by the step counter 40, and their heights being made uniform by the damping time 44. Thus, a final control level 84 is established, and this level is assumed to be just right so as to cause the liquid level curve $4'a$ to become horizontal as indicated at the point K in FIG. 3B, thus establishing stable and normal process operation following the emergency conditions which existed previously. No further control action will occur after point K until the liquid level curve $4'a$ again wanders outside of the satisfactory operation zone of FIG. 3B.

The step controller shown in FIG. 2 has nine internal adjustments including the four set-point adjustments to be made on the face of the relay meter in the limit sensor 10, these being made by actually moving physical structures which form a part of the meter which is purchased from a manufacturer of relay meters without requiring any further alteration to fit the present controller system. The other five adjustments include adjustment of two extreme limits of movement for the cam 30 by turning the potentiometers 60a and 60b, adjustment of the size of each incremental corrective step by adjustment of the potentiometer 35, adjustment of the size of each contrary step by adjustment of the potentiometer 45, and adjustment of the wait interval between successive corrective steps by rotation of the potentiometer 37 to cause the wait-interval to approximate the overall system lag.

The present invention is not to be limited to the exact form shown in the drawings, or to the particular examples discussed in the specification, which examples are taken from practical uses to which the step controller is presently being put, but are not intended to limit these uses in any way. The invention is set forth in the following claims.

I claim:

1. A step controller for delivering an output signal to control an operating variable of a process in response to an input signal representing a measured process parameter which is sensitive to changes in said operating variable, comprising:
   (a) means for receiving said input signal and including means for establishing spaced operating limits defining a normal functioning range for said input signal, and including means for selectively initiating at least one set of upper and lower control signals whenever said operating limits are exceeded;
   (b) output signal generating means including means for adjusting the level of the generated output signal according to a predetermined function in incremental steps in response to a control signal and in a direction determined thereby;
   (c) timer means operative to inhibit for a predetermined interval after each step the initiation of another incremental step;
   (d) means for accumulating an indication of the incremental effects of the steps made while said input signal was exceeding an operating limit; and
   (e) process-control damping means responsive to the return of the input signal within said normal range to readjust said generating means in the contrary direction to retract said output signal through a preset percentage of the said accumulated step effects.

2. In a step controller as set forth in claim 1, said means for receiving said input signal comprising a meter relay having set points on its dial comprising said operating limits, the meter including means for indicating the process parameter represented by the input signal, and said controller further including meter means connected to said output signal to indicate the degree of control applied to said process variable.

3. In a step controler as set forth in claim 1, said output signal generating means comprising a cam having a surface contour which varies with displacement according to said predetermined function; a source of control signal operatively connected to said cam for modulation by the latter according to its displacement; and means to drive the cam through a given displacement in response to the presence of one of said control signals and in a direction determined by the latter.

4. In a step controller as set forth in claim 3, means coupled with the cam for developing signal representative of cam displacement; and means to establish upper and lower limitations for said cam-displacement signal and operative in response to the latter reaching one of said limitations to inhibit displacement therebeyond of said cam by said drive means.

5. In a step controller as set forth in claim 1, said output signal generating means comprising a cam having a surface contour which varies with displacement according to said predetermined function; a source of control signal operatively connected to said cam for modulation by the latter according to its displacement; constant-speed motor means connected to displace the cam in response to the presence of one of said control signals and in a direction determined by the latter; and motor-run timing means for standardizing each run to a preset duration, and for actuating said interval timer means at the end of each run.

6. In a step controller as set forth in claim 5, said accumulating means comprising counter means for counting the number of incremental steps made in response to the input signal exceeding an operating limit; and said damping means comprising means for reversing the constant sped motor in response to return of the input signal within said normal range, means for reversing said step counter means and for initiating a contrary run of the motor for each accumulated count, and means for timing each such contrary run of the motor to a preadjusted duration which is no greater than the duration preset by said motor-run timing means.

7. In a controller as set forth in claim 1, said means for establishing limits further including means for establishing emergency override limits outside of said normal range beyond said operating limits and responsive to excessive input-signal excursions, and said controller including means for initiating alarm signals representing the direction of an excessive excursion and operative to adjust said generating means to deliver a maximum output signal in a direction tending to counteract said excursion, and the alarm initiating means being connected to enable said accumulating means to retain its accumulated step effects while the override means is operative and pending return of the input signal within said normal range.

8. In a controller as set forth in claim 7, said output signal generating means including cam means shaped to vary with displacement according to said predetermined function and controlling the magnitude of said output signal; drive means to displace the cam in response to the presence of a control signal; means coupled with the cam for developing a signal representing cam displacement; and means to establish upper and lower limitations for said cam-displacement signal and operative in response to the latter reaching one of said limitations to inhibit displacement therebeyond of said cam by said drive means.

9. In a controller as set forth in claim 7, manual control means, and switch means for substituting the manual control means in place of the means for initiating alarm signals to permit manual adjustment of said output signal generating means.

References Cited
UNITED STATES PATENTS

| | | | |
|---|---|---|---|
| 3,067,766 | 12/1962 | Connell | 137—386 |
| 3,222,996 | 12/1965 | Thieme | 137—596.2 X |

THOMAS E. LYNCH, Primary Examiner

U.S. Cl. X.R.

137—386